US008121216B2

(12) United States Patent
Yoshida et al.

(10) Patent No.: US 8,121,216 B2
(45) Date of Patent: Feb. 21, 2012

(54) CHANNEL ESTIMATION DEVICE, EQUALIZATION DEVICE, AND RADIO SYSTEM

(75) Inventors: Shousei Yoshida, Tokyo (JP); Masayuki Kimata, Minato-ku (JP)

(73) Assignee: NEC Corporation, Tokyo (JP)

( * ) Notice: Subject to any disclaimer, the term of this patent is extended or adjusted under 35 U.S.C. 154(b) by 776 days.

(21) Appl. No.: 12/162,126

(22) PCT Filed: Jan. 23, 2007

(86) PCT No.: PCT/JP2007/050962
§ 371 (c)(1),
(2), (4) Date: Jul. 24, 2008

(87) PCT Pub. No.: WO2007/086364
PCT Pub. Date: Aug. 2, 2007

(65) Prior Publication Data
US 2009/0022253 A1    Jan. 22, 2009

(30) Foreign Application Priority Data
Jan. 24, 2006   (JP) ................. 2006-015051

(51) Int. Cl.
*H04L 25/49* (2006.01)
*H04B 1/76* (2006.01)

(52) U.S. Cl. ........ 375/296; 375/144; 375/229; 370/342; 370/335

(58) Field of Classification Search .......... 375/295, 375/144, 229; 370/342, 335
See application file for complete search history.

(56) References Cited

U.S. PATENT DOCUMENTS 5,970,060 A * 10/1999 Baier et al. ................. 370/342
2006/0203932 A1 * 9/2006 Palanki et al. ............... 375/295

FOREIGN PATENT DOCUMENTS
CN    1404675 A    3/2003
(Continued)

OTHER PUBLICATIONS

David Falconer, et al.; "Frequency Domain Equalization for Single-Carrier Broadband Wireless Systems"; Wideband Wireless Access Technologies to Broadband Internet; IEEE Communications Magazine; Apr. 2002; pp. 58-66.

(Continued)

*Primary Examiner* — Khanh C Tran
*Assistant Examiner* — Ross Varndell
(74) *Attorney, Agent, or Firm* — Sughrue Mion, PLLC

(57) ABSTRACT

Provided are a channel estimation device and an equalization device capable of achieving high channel estimation accuracy with less amount of calculation processing. The equalization device includes: a channel estimation section including a ZF calculation/clipping processing section and correlation processing section; a weight calculation section; and an equalization filter. The ZF calculation/clipping processing section uses a signal obtained by converting a pilot code into a frequency domain to calculate a pilot reference signal according to a Zero Forcing (ZF) method and clips the gain of the calculated pilot reference signal to a predetermined value to generate a clipped pilot reference signal. The correlation processing section performs correlation between a pilot reception signal in the frequency domain and clipped pilot reference signal to estimate channel characteristics of the frequency domain. The weight calculation section calculates an equalization weight based on the channel characteristics of the frequency domain. The equalization filter performs equalization processing of a frequency domain reception signal using the equalization weight.

18 Claims, 8 Drawing Sheets

FOREIGN PATENT DOCUMENTS

| | | |
|---|---|---|
| CN | 1567762 A | 1/2005 |
| JP | 2005-051404 A | 2/2005 |
| JP | 2005-151447 A | 6/2005 |
| JP | 2005-167674 A | 6/2005 |
| JP | 2005-223698 A | 8/2005 |
| JP | 2005-244291 A | 9/2005 |
| JP | 2005-328311 A | 11/2005 |

OTHER PUBLICATIONS

Noriaki Miyazaki, et al.; "A Study on Applying Frequency Domain Equalization to Single Carrier CDMA Cellular System (Part 1)"; 2004; p. 639; The Institute of Electronics, Information and Communication Engineers.

* cited by examiner

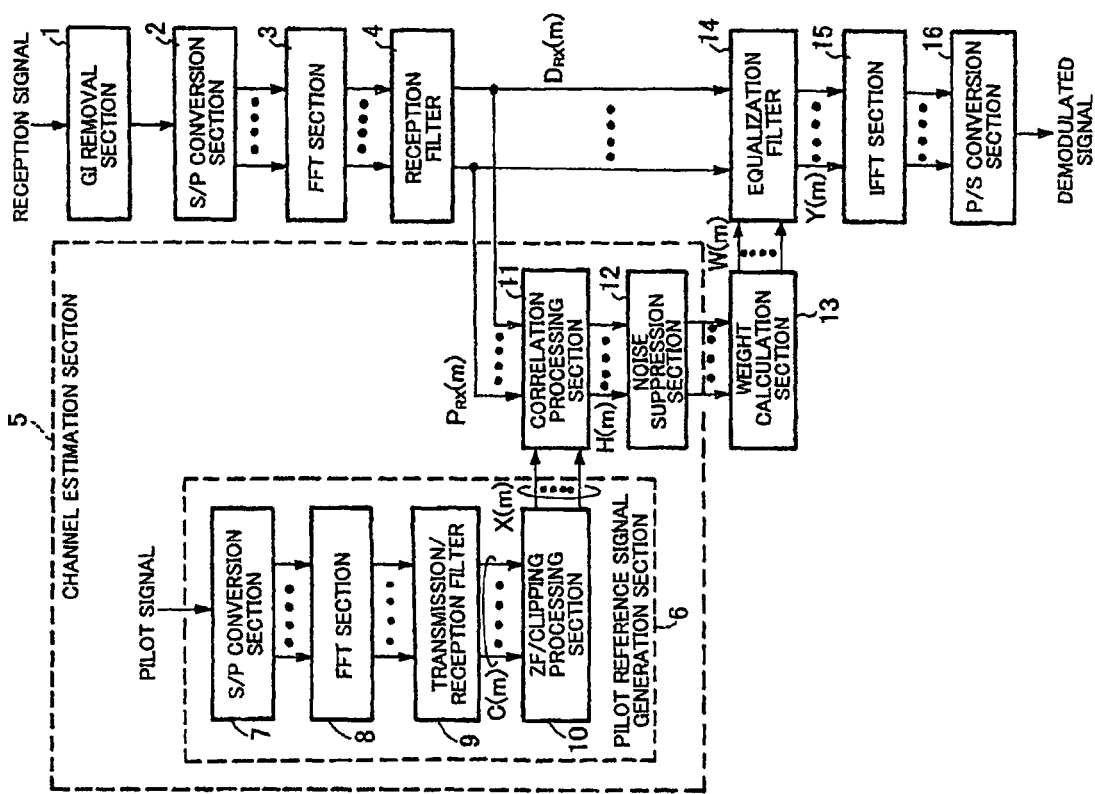

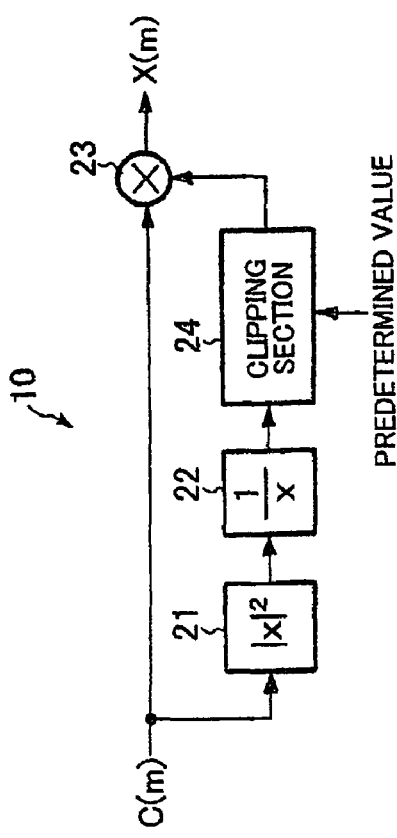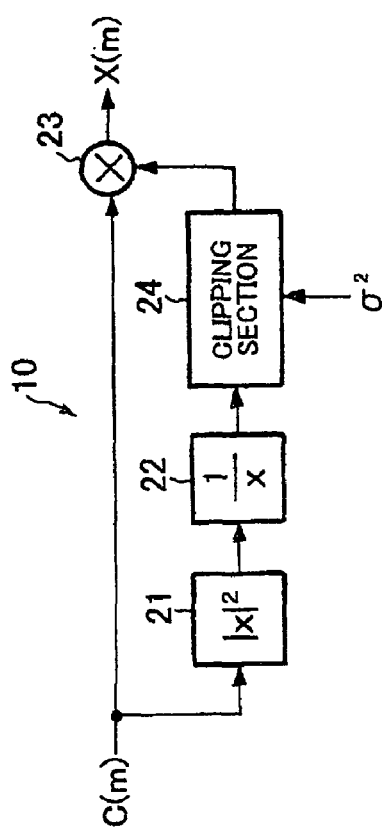

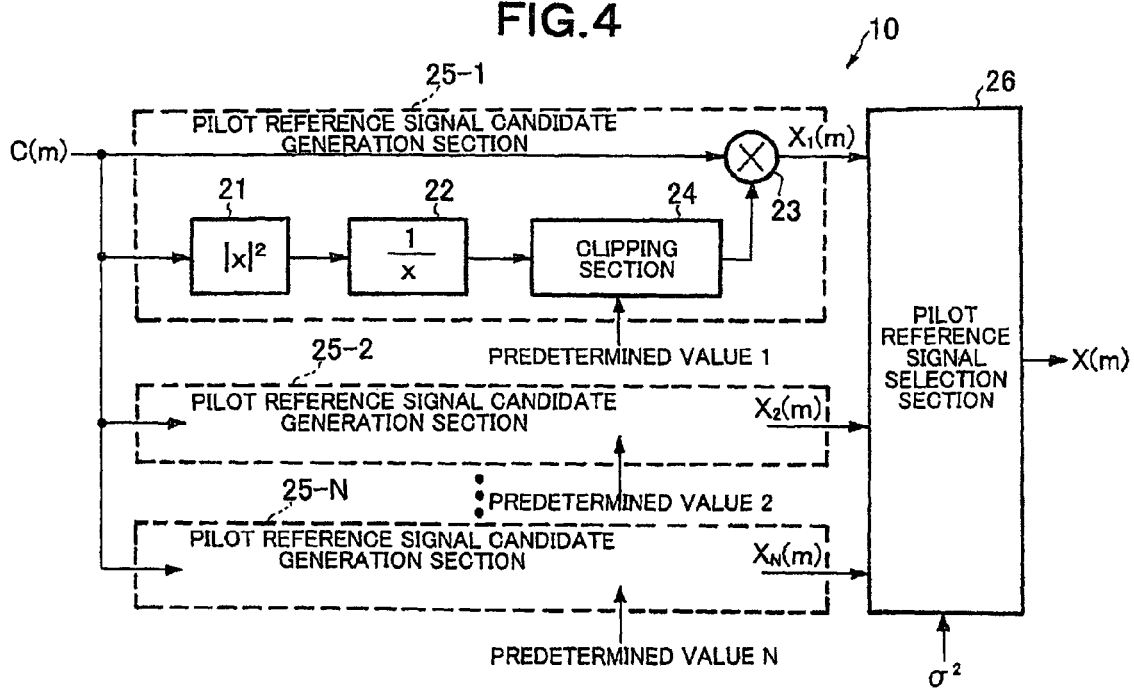

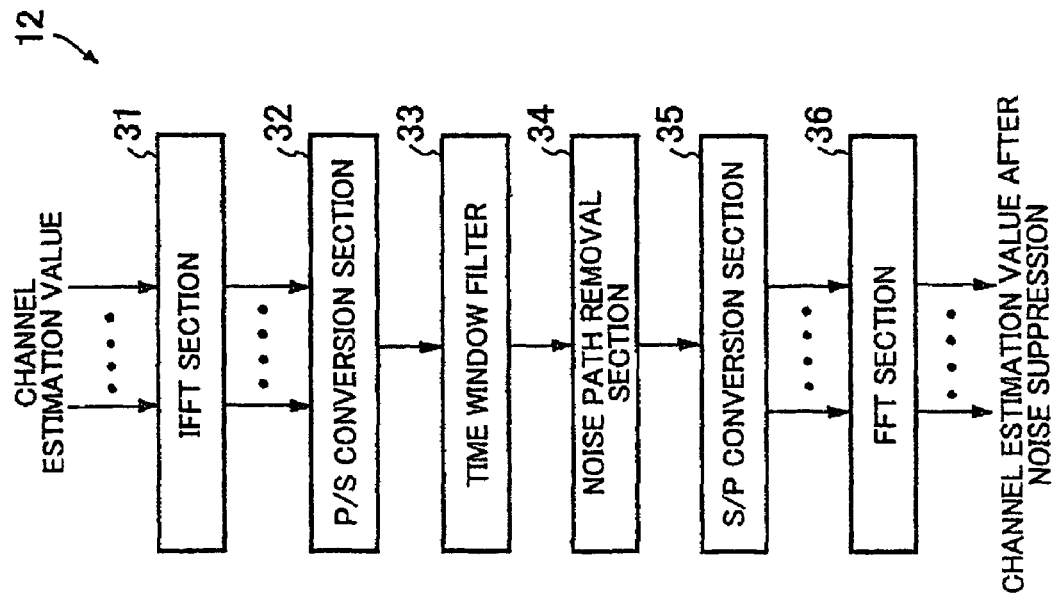

CHANNEL ESTIMATION DEVICE, EQUALIZATION DEVICE, AND RADIO SYSTEM

CROSS-REFERENCE TO RELATED APPLICATIONS

The present Application claims priority from Application JP 2006-015051, filed on Jan. 24, 2006 and claims domestic benefit from PCT/JP2007/050962, filed on Jan. 23, 2007.

TECHNICAL FIELD

The present invention relates to a channel estimation device, an equalization device, and a radio system and, more particularly, to a channel estimation device and an equalization device that convert a single carrier signal into a frequency domain signal and perform channel estimation and equalization processing through frequency domain signal processing.

BACKGROUND ART

In an uplink radio system for next-generation mobile communication, importance is attached to a high transmission power efficiency of terminals in order to expand communication areas. As a radio scheme that satisfies the requirement, a system employing a single carrier (SC) having a low peak to average power ratio (PAPR) has been under consideration. Further, in the next-generation mobile communication in which high-speed data transmission is essential, when the SC signal is used to perform high-speed data transmission, interference between symbols (multipath interference) may occur.

As a simple method for suppressing the multipath interference, a linear equalizer can be used, and a frequency domain equalizer that performs equalization processing through frequency domain signal processing so as to significantly reduce the amount of calculation processing is under examination (Non-patent Document 1). In order to calculate equalizing weight, frequency domain channel characteristics are required in the frequency domain equalizer. Thus, a method of converting a pilot reception signal directly into a frequency domain signal and estimating the channel characteristics through frequency domain correlation processing between the pilot reception signal and a pilot reference signal is being studied.

FIG. 9 shows a configuration of a channel estimation device and equalization device (frequency domain equalizer) used in a conventional radio system. The channel estimation device and equalization device include a GI (Guard Interval) removal section 101, an S/P (Serial/Parallel) conversion section 102, an FFT (Fast Fourier Transform) section 103, a reception filter 104, a channel estimation section 105, a weight calculation section 113, an equalization filter 114, an IFFT (Inverse Fast Fourier Transform) section 115, and a P/S (Parallel/Serial) conversion section 116.

An example of a radio frame format in the case where a frequency domain equalizer is used is shown in FIG. 6. A radio frame signal is composed of a plurality of pilot signal blocks or a plurality of data signal blocks. In the example of FIG. 6, a pilot signal block is placed at the head of the radio frame signal followed by a plurality of successive data signal blocks.
A GI is added to the head of each block before FFT processing in order to avoid multipath interference from a block preceding each block. As the GI, a cyclic prefix is typically used which adds the last data in each block to the head thereof.

The GI removal section 101 receives a reception signal and removes a portion of the reception signal corresponding to GI. The S/P conversion section 102 performs a serial to parallel conversion of the reception signal from which the GI has been removed by the GI removal section 101. The FFT section 103 is supplied with the reception signal that has been subjected to the S/P conversion by S/P conversion section 102 and applies $N_{FFT}$ ($N_{FFT}$ is an integer equal to or more than 2 and power of 2)-point FFT to the reception signal for conversion into a signal in a frequency domain.

The reception filter 104 limits the band of the reception signal within the frequency domain so as to shape the waveform and suppress noise. As the reception filter 104, a raised cosine roll-off filter is typically used. Although, in the configuration shown in FIG. 9, filtering of the reception signal is performed through frequency domain signal processing, the filtering may be performed prior to the processing of the FFT section 103 through time domain signal processing.

The channel estimation section 105 performs frequency domain correlation processing between a pilot reception signal and a pilot reference signal to estimate channel characteristics. The channel estimation section 105 includes a pilot reference signal generation section 106, a correlation processing section 111, and a noise suppression section 112.

The pilot reference signal generation section 106 includes a S/P conversion section 107, an FFT section 108, a transmission/reception filter 109, and a ZF (Zero Forcing)/MMSE (Minimum Mean Square Error) calculation section 110.

The S/P conversion section 107 performs a serial to parallel conversion of a pilot code. The FFT section 108 applies FFT to the pilot code that has been subjected to the S/P conversion by the S/P conversion section 107 to convert the pilot code into a frequency domain. The transmission/reception filter 109 passes a frequency domain signal of the pilot code though a transmission/reception filter. Although, in the configuration shown in FIG. 9, filtering of the frequency domain signal of the pilot code is performed through frequency domain signal processing, the filtering may be performed prior to the processing of the FFT section 108 through time domain signal processing. The processing of the transmission/reception filter 109 may be omitted in order to reduce the amount of calculation processing.

The ZF/MMSE calculation section 110 uses a signal output from the transmission/reception filter 109 to calculate a pilot reference signal used in the correlation processing.

FIG. 10 shows a configuration of the ZF calculation section 110 that calculates a pilot reference signal for use in ZF channel estimation. The ZF calculation section 110 includes a square calculation section 121, an inverse number calculation section 122, and a multiplication section 123. A pilot reference signal X(m) ($1 \leq m \leq N_{FFT}$) of a sub-carrier m required for performing the ZF channel estimation is represented by the following equation.

[Numeral 1]

$$X(m) = \frac{C(m)}{|C(m)|^2} \quad (1)$$

where C(m) is the output signal of the transmission/reception filter 109.

FIG. 11 shows a configuration of the MMSE calculation section 110 that calculates a pilot reference signal for use in MMSE channel estimation. The MMSE calculations section 110 includes a square calculation section 121, a noise addition section 124, an inverse number calculation section 122, and a multiplication section 123. A pilot reference signal X(m) ($1 \leq m \leq N_{FFT}$) of a sub-carrier m required for performing the MMSE channel estimation is represented by the following equation.
[Numeral 2]

$$X(m) = \frac{C(m)}{|C(m)|^2 + \sigma^2} \quad (2)$$

where $\sigma^2$ is noise power.

The correlation processing section 111 is supplied with the pilot reference signal X(m) and pilot reception signal, the band of which has been limited by reception filter 104 and performs correlation between them for each sub-carrier to estimate frequency domain channel characteristics. A channel estimation value H (m) ($1 \leq m \leq N_{FFT}$) of a sub-carrier m is calculated according to the following equation.
[Numeral 3]

$$H(m) = X^*(m) P_{RX}(m) \quad (3)$$

where $P_{RX}$ (m) is the pilot reception signal, the band of which has been limited by reception filter 104, a suffix * is a complex conjugation. In the ZF channel estimation, code characteristics of the pilot reception signal can be canceled, together with the characteristics of the transmission/reception filter, whereby only the channel characteristics H (m) can be detected. However, if the size of the frequency domain signal of the pilot code is not constant, noise enhancement occurs, degrading the channel estimation accuracy.

FIG. 7 shows gain characteristics ($1/|C(m)|^2$ characteristics) of the pilot reference signal obtained in the case where a random code is used as the pilot code. In the inherent characteristics of a code and at the edge of the band, when the gain is greater than 0 dB due to attenuation of the transmission/reception filter, noise enhancement occurs. In the MMSE channel estimation, in order to suppress the noise enhancement, the gain of the pilot reference signal is determined such that the mean square error of the channel estimation value becomes minimum, which improves the channel estimation accuracy as compared with the case of the ZF channel estimation.

The noise suppression section 112 suppresses the noise of the channel estimation value estimated by the correlation processing section 111 to thereby improve the ratio of signal power to noise power (S/N). The noise suppression section 112 may employ a method of averaging adjacent sub-carriers, a method of temporarily converting a channel estimation value into an estimation value in a time domain to remove a noise path, or the like.

The weight calculation section 113 is supplied with the channel estimation value in the frequency domain which is output from the channel estimation section 105 and calculates an equalization weight in accordance with an MMSE method, in general. An MMSE weight W(m) ($1 \leq m \leq N_{FFT}$) on a sub-carrier m is calculated using the channel estimation value H(m) according to the following equation.
[Numeral 4]

$$W(m) = \frac{H(m)}{|H(m)|^2 + \sigma^2} \quad (4)$$

The equalization filter 114 is supplied with the equalization weight calculated by the weight calculation section 113 and reception signal, the band of which has been limited by the reception filter 104 and equalizes, in the frequency domain, the reception signal by multiplying the reception signal by the equalization weight for each sub-carrier. Assuming that data reception signal, the band of which has been limited by the reception filter 104 is $D_{RX}(m)$ ($1 \leq m \leq N_{FFT}$) and the weight calculated by the weight calculation section 113 is W (m), a signal Y(m) ($1 \leq m \leq N_{FFT}$) equalized by the equalization filter 114 is represented by the following equation.
[Numeral 5]

$$Y(m) = W^*(m) D_{RX}(m) \quad (5)$$

where a suffix * is a complex conjugation.

The IFFT section 115 is supplied with the equalized signal in the frequency domain output from the equalization filter 114 and applies $N_{FFT}$-point IFFT to the equalized signal for conversion into a signal in the time domain. The P/S conversion section 116 performs a parallel to serial conversion of the signal in the time domain so as to output it as a demodulated signal.

Non-patent Document 1: D. Falconer, S. L. Ariyavisitakul, A. Benyamin-Seeyar, and B. Eidson, "Frequency Domain Equalization for Single-Carrier Broadband Wireless Access," IEEE Commun. Mag., vol. 40, no. 4, pp. 58-66, April 2002.

DISCLOSURE OF THE INVENTION

Problems to be Solved by the Invention

As described above, in the conventional channel estimation device and equalization device, when the ZF/MMSE calculation section 110 and correlation processing section 111 perform the ZF channel estimation, the noise enhancement occurs if the size of the frequency domain signal of the pilot code is not constant, degrading the channel estimation accuracy, which may result in degradation of equalization characteristics.

Further, when the channel estimation is performed using the MMSE approach, the channel estimation accuracy is increased as compared with the ZF approach, while the amount of calculation processing is increased. This is because that, since the pilot code is not changed during communication, it is sufficient to generate only once the pilot reference signal prior to communication in the case where the ZF channel estimation is performed, while it is necessary, in the MMSE transmission estimation, to perform processing of the noise addition section 124, inverse number calculation section 122, and multiplication section 123 shown in FIG. 11 every time the noise power value is updated so as to calculate the pilot reference signal.

An object of the present invention is to provide a channel estimation device and an equalization device that convert a single carrier signal into a frequency domain signal and perform channel estimation and equalization processing through frequency domain signal processing, in which by clipping the gain of a pilot reference signal for use in correlation processing of a channel estimation section to a predetermined value, high channel estimation accuracy can be achieved with less amount of calculation processing.

Means for Solving the Problems

To solve the above problems, according to one aspect of the present invention, there is provided a channel estimation device that converts a single carrier signal into a frequency domain signal and estimates channel characteristics through frequency domain signal processing, characterized by comprising: a ZF calculation/clipping processing section that uses a signal obtained by converting a pilot code into a frequency domain to calculate a pilot reference signal according to a Zero Forcing (ZF) method and clips the gain of the calculated pilot reference signal to a predetermined value to generate a clipped pilot reference signal; and a correlation processing section that performs correlation between a pilot reception signal in the frequency domain and clipped pilot reference signal to estimate channel characteristics of the frequency domain.

According to a second aspect of the present invention, there is provided an equalization device that converts a single carrier signal into a frequency domain signal and performs equalization processing through frequency domain signal processing, characterized by comprising: a ZF calculation/clipping processing section that uses a signal obtained by converting a pilot code into a frequency domain to calculate a pilot reference signal according to a Zero Forcing (ZF) method and clips the gain of the calculated pilot reference signal to a predetermined value to generate a clipped pilot reference signal; a correlation processing section that performs correlation between a pilot reception signal in the frequency domain and clipped pilot reference signal to estimate channel characteristics of the frequency domain; a weight calculation section that calculates an equalization weight based on the channel characteristics of the frequency domain; and an equalization filter that performs equalization processing of a frequency domain reception signal using the equalization weight.

The ZF calculation/clipping processing section may change, in an adaptive manner, the predetermined value of the clipping in inversely proportional to a noise power value. The ZF calculation/clipping processing section may previously calculate a plurality of pilot reference signal candidates clipped to different predetermined values and select, from the plurality of pilot reference signal candidates, a pilot reference signal clipped to an optimum value based on a value inversely proportional to the noise power value.

The channel estimation device and equalization device may comprise, in the rear stage of the correlation processing section, a noise suppression section that suppresses noise of a channel estimation value estimated by the correlation processing section to improve the ratio of signal power to noise power (S/N). The noise suppression section may include one or both of: a time window filter that removes a part of the path other than a predetermined section as a noise path from the respective paths of the channel response obtained by converting the channel estimation value estimated by the correlation processing section in a time domain; and a noise path removal section that removes a path having a value less than a predetermined noise threshold value as a noise path, and may convert the channel response from which the noise path has been removed into the frequency domain so as to output a channel estimation value in which noise has been suppressed.

The weight calculation section may calculate the equalization weight based on an MMSE (Minimum Mean Square Error) method or a ZF method Advantages of the Invention According to the present invention, there are provided a channel estimation device and an equalization device that convert a single carrier signal into a frequency domain signal and perform channel estimation and equalization processing through frequency domain signal processing, in which by clipping the gain of a pilot reference signal for use in correlation processing of a channel estimation section to a predetermined value, high channel estimation accuracy can be achieved with less amount of calculation processing.

BRIEF DESCRIPTION OF THE DRAWINGS

FIG. 1 is configuration view of a channel estimation device and an equalization device used in a radio system according to a first example of the present invention;

FIG. 2 is a block diagram showing a configuration of a ZF calculation/clipping processing section in the first example of the present invention;

FIG. 3 is a block diagram showing a configuration of a ZF calculation/clipping processing section in a second example of the present invention;

FIG. 4 is a block diagram showing a configuration of a ZF calculation/clipping processing section in a third example of the present invention;

FIG. 5 is a block diagram showing a configuration example of a noise suppression section in the first example of the present invention;

EXPLANATION OF REFERENCE SYMBOLS

Figure 6:
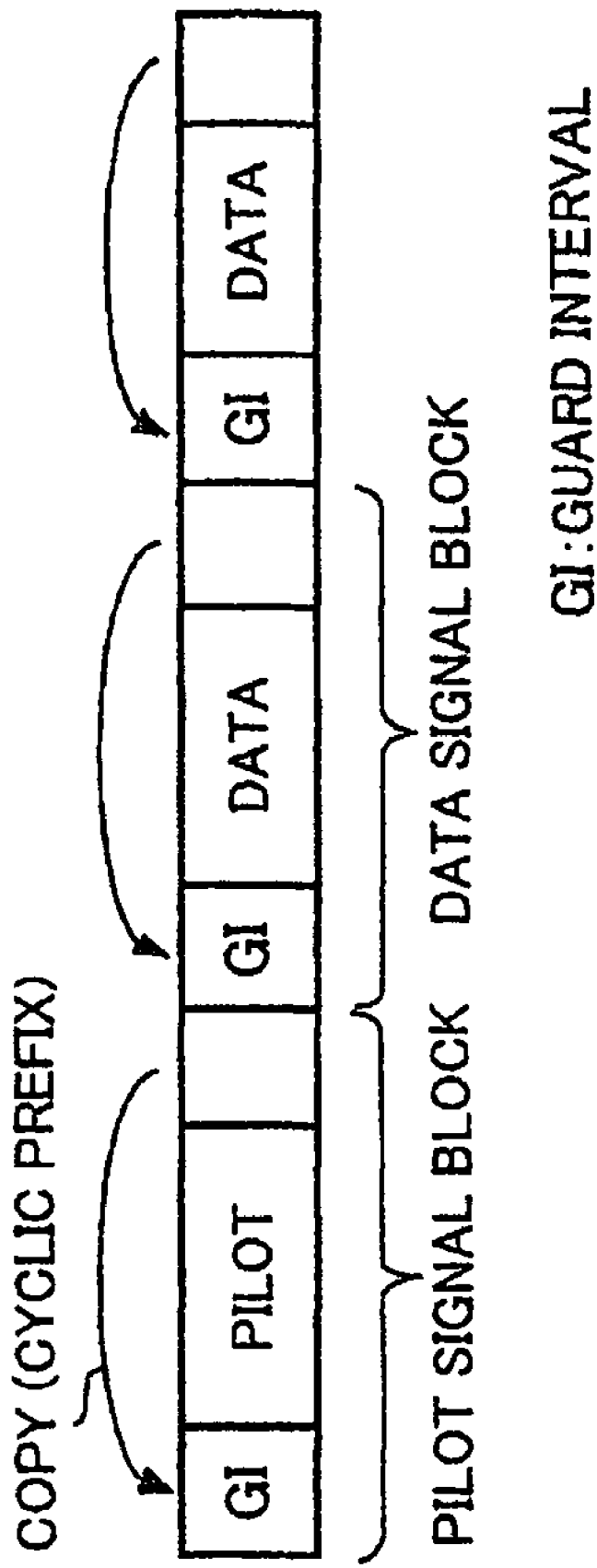
FIG. 6 is a view showing an example of a radio frame format in the case where a frequency domain equalizer is used in a conventional example.
Figure 7:
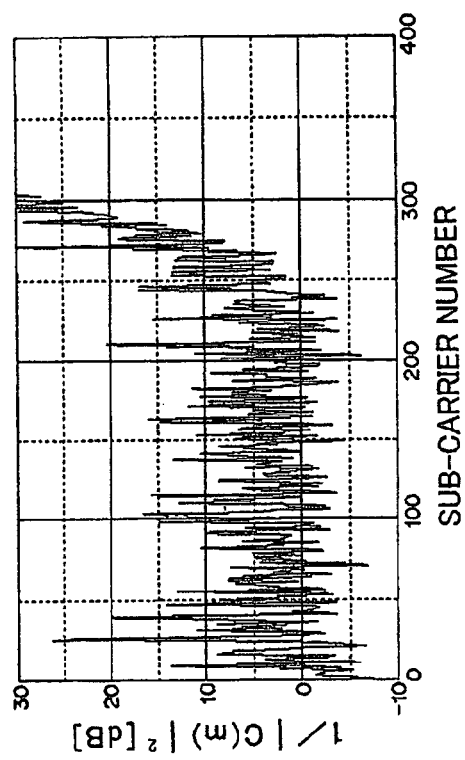
FIG. 7 is a view showing gain characteristics of a pilot reference signal obtained in the case where a random code is used as a pilot code in the conventional example.

1, 101: GI removal section
2, 7, 35, 102, 107: S/P conversion section
3, 8, 36, 103, 108: FFT section
4, 104: Reception filter
5, 105: Channel estimation section
6, 106: Pilot reference signal generation section
9, 109: Transmission/reception filter
10: ZF calculation/clipping processing section
11, 111: Correlation processing section
12, 112: Noise suppression section
13, 113: Weight calculation section
14, 114: Equalization filter
15, 31, 115: IFFT section
16, 32, 116: P/S conversion section
21, 121: Square calculation section
22, 122: Inverse number calculation section
23, 123: Multiplication section
24: Clipping section
25-1 to N: Pilot reference signal candidate generation section
26: Pilot reference signal selection section
33: Time window filter
34: Noise path removal section
110: ZF/MMSE calculation section
124: Noise addition section

DESCRIPTION OF EXEMPLARY EMBODIMENTS

Now, an exemplary embodiment of the present invention will be described in greater detail by referring to the accompanying drawings.

First Example

FIG. 1 is a configuration view of a first example of a channel estimation device and an equalization device according to the present invention. The channel estimation device and equalization device used in a radio system according to the present example shown in FIG. 1 include a GI removal section 1, an S/P conversion section 2, an FFT section 3, a reception filter 4, a channel estimation section 5, a weight calculation section 13, an equalization filter 14, an IFFT section 15, and a P/S conversion section 16. The present example is featured in that the gain of a pilot reference signal for use in correlation processing of the channel estimation section 5 is clipped to a predetermined value.

The GI removal section 1 receives a reception signal and removes a portion of the reception signal corresponding to GI. The S/P conversion section 2 performs a serial to parallel conversion of the reception signal from which the GI has been removed by GI removal section 1. The FFT section 3 is supplied with the reception signal that has been subjected to the S/P conversion by the S/P conversion section 2 and applies NFFT (NFFT is an integer equal to or more than 2 and power of 2)-point FFT to the reception signal for conversion into a signal in a frequency domain.

The reception filter 4 limits the band of the reception signal within the frequency domain so as to shape the waveform and suppress noise. As the reception filter 4, a raised cosine roll-off filter is typically used. Although, in the configuration shown in FIG. 1, filtering of the reception signal is performed through frequency domain signal processing, the filtering may be performed prior to the processing of the FFT section 3 through time domain signal processing.

The channel estimation section 5 performs frequency domain correlation between a pilot reception signal and a pilot reference signal to estimate channel characteristics. The channel estimation section 5 includes a pilot reference signal generation section 6, a correlation processing section 11, and a noise suppression section 12.

The pilot reference signal generation section 6 includes a S/P conversion section 7, an FFT section 8, a transmission/reception filter 9, and a ZF calculation/clipping processing section 10. The S/P conversion section 7 performs a serial to parallel conversion of a pilot code. The FFT section 8 applies FFT to the pilot code that has been subjected to the S/P conversion by the S/P conversion section 7 to convert the pilot code into a frequency domain. The transmission/reception filter 9 passes a frequency domain signal of the pilot code through a transmission/reception filter. Although, in the configuration shown in FIG. 1, filtering of the frequency domain signal of the pilot code is performed through frequency domain signal processing, the filtering may be performed prior to the processing of the FFT section 8 through time domain signal processing. The processing of the transmission/reception filter 9 may be omitted in order to reduce the amount of calculation processing.

The ZF calculation/clipping processing section 10 uses a signal output from the transmission/reception filter 9 to calculate a pilot reference signal used in the correlation processing.

FIG. 2 shows a configuration of the ZF calculation/clipping processing section 10 in the first example.

The ZF calculation/clipping processing section 10 includes a square calculation section 21, an inverse number calculation section 22, a clipping section 24 and a multiplication section 23. The clipping section 24 clips the gain $(1/|C(m)|^2)$ of the pilot reference signal calculated using a ZF method to a predetermined value. A pilot reference signal $X(m)$ $(1 \leq m \leq N_{FFT})$ of a sub-carrier m required for performing channel estimation is represented by the following equation.

[Numeral 6]

$$X(m)=G(m)C(m) \qquad (6)$$

where $G(m)$ is the gain of the pilot reference signal that has been subjected to the clipping, which is calculated according to the following equation.

[Numeral 7]

$$G(m) = \begin{cases} \dfrac{1}{|C(m)|^2} & \dfrac{1}{|C(m)|^2} < G_{TH} \\ G_{TH} & \dfrac{1}{|C(m)|^2} \geq G_{TH} \end{cases} \qquad (7)$$

where $G_{TH}$ is a predetermined value (clipping value) of the clipping.

The correlation processing section 11 is supplied with the pilot reference signal $X(m)$ and pilot reception signal $P_{RX}(m)$, the band of which has been limited by reception filter 4 and performs correlation between them for each sub-carrier to estimate frequency domain channel characteristics. A channel estimation value $H(m)$ $(1 \leq m \leq N_{FFT})$ of a sub-carrier m is calculated according to the following equation.

[Numeral 8]

$$H(m)=X^*(m)P_{RX}(m) \qquad (8)$$

where a suffix * is a complex conjugation.

In the channel estimation according to the present example, in the case where the size of a frequency domain signal of the pilot code is not constant, the gain $G(m)$ of the pilot reference signal is limited to a value not more than the predetermined value $G_{TH}$ to thereby reduce noise enhancement.

Figure 8:
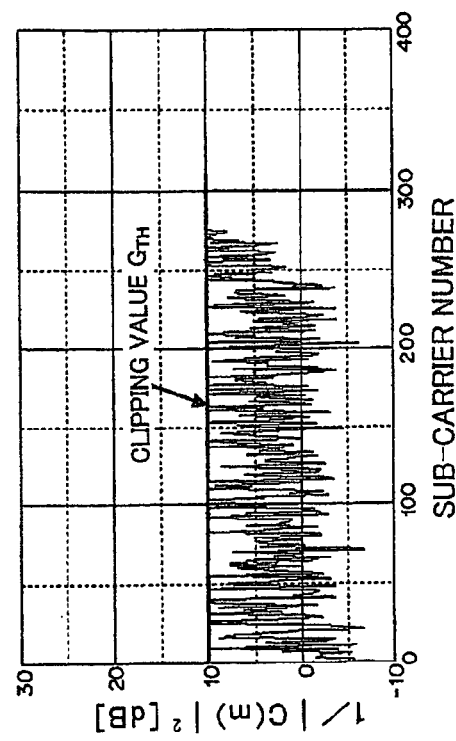
FIG. 8 is a view showing the gain characteristics of the pilot reference signal that has been subjected to clipping in the first example of the present invention.
Figure 9:
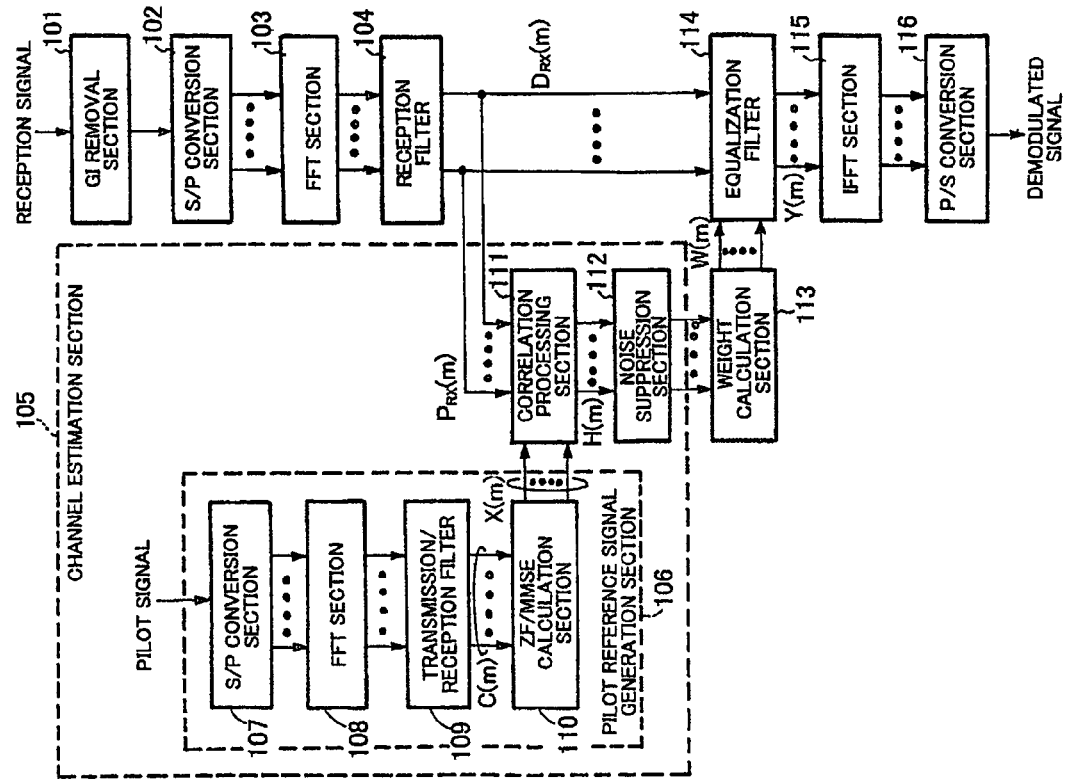
FIG. 9 is a block diagram showing a channel estimation device and an equalization device according to the conventional example.
Figure 10:
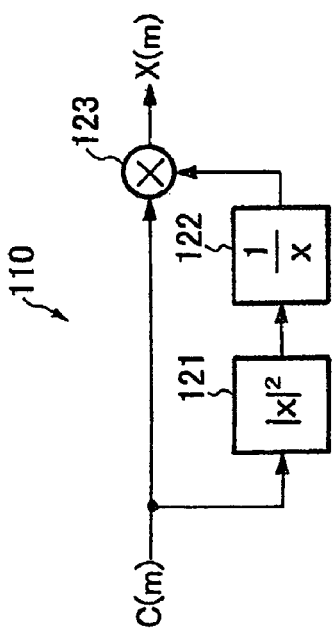
FIG. 10 is a configuration of a ZF calculation section in a ZF/MMSE calculation section in the conventional example.
Figure 11:
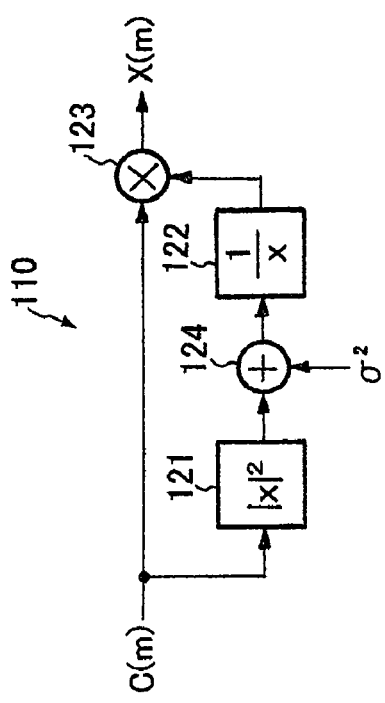
FIG. 11 is a configuration of an MMSE calculation section in the ZF/MMSE calculation section in the conventional example.

FIG. 8 shows the gain characteristics ($G(m)$ characteristics) of the pilot reference signal clipped to a clipping value $G_{TH}$ of 10 dB. As can be seen from FIG. 8, by limiting the maximum gain of the $G(m)$ to 10 dB, it is possible to reduce noise enhancement to thereby improve channel estimation accuracy as compared to the case of the ZF channel estimation. Further, as in the case of the ZF channel estimation, it is sufficient to generate the pilot reference signal only once prior to communication, making it possible to avoid an increase in the amount of calculation processing.

The noise suppression section 12 suppresses the noise of the channel estimation value estimated by the correlation processing section 11 to thereby improve the ratio of signal power to noise power (S/N). The noise suppression section 12 may employ a method of averaging adjacent sub-carriers, a method of temporarily converting a channel estimation value into an estimation value in a time domain to remove a noise path, or the like.

FIG. 5 shows a configuration example of the noise suppression section 12. The noise suppression section 12 includes an IFFT section 31, a P/S conversion section 32. a time window filter 33, a noise path removal section, an S/P conversion section 35, and an FFT section 36.

The IFFT section 31 converts the channel estimation value estimated by the correlation processing section 11 into a channel response in the time domain. The P/S conversion section 32 performs a parallel to serial conversion of the channel response. The time window filter 33 passes the channel response that has been subjected to the P/S conversion through a time window filter to thereby suppress noise. For example, under the assumption that the channel response values are within the GI width, a part of the path other than a section corresponding to the GI width is removed (substituted with 0) as a noise path from the respective values (paths) of the channel response.

The noise path removal section 33 removes (substitutes 0 for) a path having a value less than a predetermined noise threshold value (value obtained by adding a predetermined threshold value to noise level) from respective paths that have been passed through the time window filter as a noise path. As the noise threshold value, the average value of the noise that have been removed by the time window filter can be used. Although both the time window filter 33 and noise path removal section 34 are used in the configuration of FIG. 5, a configuration in which one of the time window filter 33 and noise path removal section 34 is omitted may be employed.

The S/P conversion section 34 performs a serial to parallel conversion of the channel response from which the noise paths have been removed. The FFT section 35 converts the S/P converted channel response into a signal in the frequency domain to output a channel estimation value in which S/N has been improved.

The weight calculation section 13 is supplied with the channel estimation value in the frequency domain output from the channel estimation section 5 and calculates an equalization weight in accordance with an MMSE method, in general. An MMSE weight $W(m)$ ($1 \leq m \leq N_{FFT}$) on a sub-carrier m is calculated using the channel estimation value $H(m)$ and noise power $\sigma^2$ according to the following equation.
[Numeral 9]

$$W(m) = \frac{H(m)}{|H(m)|^2 + \sigma^2} \qquad (9)$$

The equalization filter 14 is supplied with the equalization weight calculated by the weight calculation section 13 and reception signal, the band of which has been limited by the reception filter 4 and equalizes, in the frequency domain, the reception signal by multiplying the reception signal by the equalization weight for each sub-carrier. Assuming that data reception signal, the band of which has been limited by the reception filter 4 is $D_{RX}(m)$ ($1 \leq m \leq N_{FFT}$) and the weight calculated by the weight calculation section 13 is $W(m)$, a signal $Y(m)$ ($1 \leq m \leq N_{FFT}$) equalized by the equalization filter 14 is represented by the following equation.
[Numeral 10]

$$Y(m) = W^*(m) D_{RX}(m) \qquad (10)$$

where a suffix * is a complex conjugation.

The IFFT section 15 is supplied with the equalized signal in the frequency domain output from the equalization filter 14 and applies $N_{FFT}$-point IFFT to the equalized signal for conversion into a signal in the time domain. The P/S conversion section 16 performs a parallel to serial conversion of the signal in the time domain so as to output it as a demodulated signal.

As described above, in the present example, by clipping the gain of a pilot reference signal calculated using the ZF method to a predetermined value, it is possible to reduce the amount of calculation processing required starting from the ZF channel estimation step, thereby achieving high channel estimation accuracy.

Second Example

Another example of the present invention will next be described. The second example differs from the first example only in the operation of the ZF calculation/clipping processing section 10. The operations of the other components are same as those of the first example, and descriptions thereof are omitted here.

FIG. 3 shows a configuration of the ZF calculation/clipping processing section 10 in the second example.

The ZF calculation/clipping processing section 10 shown in FIG. 3 includes a square calculation section 21, an inverse number calculation section 22, a clipping section 24 and a multiplication section 23. In the first example, the clipping section 24 clips the gain $(1/|C(m)|^2)$ of the pilot reference signal to a predetermined value in the first example; while in the second example, the clipping section 24 clips the gain $(1/|C(m)|^2)$ of the pilot reference signal to a value inversely proportional to the noise power $\sigma^2$ in an adaptive manner. That is, when the noise power $\sigma^2$ is large, the clipping value $G_{TH}$ is reduced so as not to cause the noise enhancement. For example, the clipping value $G_{TH}$ is set as follows.
[Numeral 11]

$$G_{TH} = \frac{\beta}{\sigma^2} \qquad (11)$$

where $\beta$ is a predetermined offset value.

In the present example, the gain of the pilot reference signal is clipped based on the noise power value in an adaptive manner, thereby improving the channel estimation accuracy as compared with the ZF channel estimation. As a result, it is possible to achieve the channel estimation accuracy comparable to the MMSE channel estimation. Further, in the present example, although it is necessary to perform processing of the clipping section 24 and multiplication section 23 every time the value of the noise power value is updated, processing of the inverse number calculation section 22 can be omitted, so that it is possible to reduce the amount of calculation as compared with the MMSE channel estimation.

As described above, in the present example, the gain of the pilot reference signal calculated using the ZF method is clipped based on the noise power value in an adaptive manner, thereby achieving the channel estimation accuracy comparable to the MMSE channel estimation while reducing the amount of calculation processing as compared with the MMSE channel estimation.

Third Example

Still another example of the present invention will be described. The third example differs from the first and second examples only in the operation of the ZF calculation/clipping processing section 10. The operations of the other components are same as those of the first and second examples, and descriptions thereof are omitted here.

FIG. 4 shows a configuration of the ZF calculation/clipping processing section 10 in the third example.

The ZF calculation/clipping processing section 10 shown in FIG. 4 includes N (N is an integer equal to or more than 2)

pilot reference signal candidate generation sections 25-1 to 25-N and a pilot reference signal selection section 26. Each of the pilot reference signal candidate generation sections 25-1 to 25-N has the same configuration as that of the ZF calculation/clipping processing section shown in FIG. 2.

The pilot reference signal candidate generation sections 25-1 to 25-N clip the gain $(1/|C(m)|^2)$ of the pilot reference signal to different predetermined values (predetermined values 1 to N in FIG. 4) and calculate N pilot reference signal candidates $X1(m)$ to $XN(m)$.

The pilot reference signal selection section 26 selects, from the N pilot reference signal candidates $X1(m)$ to $XN(m)$, one that has been clipped to a value closest to the clipping value $G_{TH}$ calculated from the noise power value $\sigma^2$ according to the equation (11).

In the above second example, by clipping the gain of the pilot reference signal to a value inversely proportional to the noise power $\sigma^2$ in an adaptive manner, it is possible to achieve the channel estimation accuracy comparable to the MMSE channel estimation. However, it is necessary to perform processing of the clipping section 24 and multiplication section 23 every time the value of the noise power value $\sigma^2$ is updated, sufficient reduction of the amount of calculation processing required starting from the MMSE channel estimation step cannot be achieved.

On the other hand, in the present example, by calculating a plurality of pilot reference signal candidates in which the gain of the pilot reference signal is clipped to different predetermined values and selecting a pilot reference signal clipped to an optimum value based on the noise power value $\sigma^2$, it is possible to achieve the channel estimation accuracy comparable to the MMSE channel estimation. Further, it is sufficient to generate the plurality of pilot reference signals only once prior to communication, so that an increase in the amount of calculation processing can be avoided.

As described above, in the present example, by calculating a plurality of pilot reference signal candidates in which the gain of the pilot reference signal calculated using the ZF method is clipped to different predetermined values and selecting a pilot reference signal clipped to an optimum value based on the noise power value, it is possible to achieve the channel estimation accuracy comparable to the MMSE channel estimation while avoiding an increase in the amount of calculation processing required starting from the ZF channel estimation step.

INDUSTRIAL APPLICABILITY

The present invention can be applied to a channel estimation device and an equalization device used in a radio system. In particular, the present invention can suitably be applied to a channel estimation device and an equalization device that convert a single carrier signal into a frequency domain signal and perform channel estimation and equalization processing through frequency domain signal processing.

The invention claimed is:

1. A channel estimation device that converts a single carrier signal into a frequency domain signal and estimates channel characteristics through frequency domain signal processing, comprising:
    a ZF calculation/clipping processing section that uses a signal obtained by converting a pilot code into a frequency domain to calculate a pilot reference signal according to a Zero Forcing (ZF) method and clips the gain of the calculated pilot reference signal to a predetermined value to generate a clipped pilot reference signal; and
    a correlation processing section that performs correlation between a pilot reception signal in the frequency domain and the clipped pilot reference signal to estimate channel characteristics of the frequency domain
    wherein
    the ZF calculation/clipping processing section generates a pilot reference $X(m)$ of a sub-carrier m such that the following equations are satisfied:

$$X(m) = G(m)C(m)$$

$$G(m) = \begin{cases} \dfrac{1}{|C(m)|^2} & \dfrac{1}{|C(m)|^2} < G_{TH} \\ G_{TH} & \dfrac{1}{|C(m)|^2} \geq G_{TH} \end{cases}$$

where m ($1 \leq m \leq N_{FFT}$: $N_{FFT}$ is an integer equal to or more than 2 and power of 2) is a sub-carrier number, $C(m)$ is a signal of the sub-carrier m, obtained by converting the pilot code into the frequency domain, $G(m)$ is the gain of the clipped pilot reference signal, $X(m)$ is the clipped reference pilot signal, and $G_{TH}$ is a predetermined value of the clipping.

2. The channel estimation device according to claim 1, wherein
    the ZF calculation/clipping processing section changes, in an adaptive manner, the predetermined value of the clipping in inversely proportional to a noise power value.

3. The channel estimation device according to claim 1, wherein
    the ZF calculation/clipping processing section sets the predetermined value $G_{TH}$ of the clipping such that the following equation is satisfied:

$$G_{TH} = \frac{\beta}{\sigma^2}$$

where $G_{TH}$ is a predetermined value of the clipping, $\sigma^2$ is the noise power value, and $\beta$ is a predetermined offset value.

4. The channel estimation device according to claim 1, wherein
    the ZF calculation/clipping processing section previously calculates a plurality of pilot reference signal candidates clipped to different predetermined values and selects, from the plurality of pilot reference signal candidates, a pilot reference signal clipped to an optimum value based on a value inversely proportional to the noise power value.

5. The channel estimation device according to claim 1, characterized by further comprising, in the rear stage of the correlation processing section, a noise suppression section that suppresses noise of a channel estimation value estimated by the correlation processing section to improve the ratio of signal power to noise power (S/N).

6. The channel estimation device according to claim 5, wherein
    the noise suppression section includes one or both of: a time window filter that removes a part of the path other than a predetermined section as a noise path from the respective paths of the channel response into a time domain obtained by converting the channel estimation value estimated by the correlation processing section;

and a noise path removal section that removes a path having a value less than a predetermined noise threshold value as a noise path, and the channel response from which the noise path has been removed is converted into the frequency domain so as to output a channel estimation value in which noise has been suppressed.

7. The channel estimation device according to claim 5, wherein the noise suppression section includes: a time window filter that removes a part of the path other than a predetermined section as a noise path from the respective paths of the channel response obtained by converting the channel estimation value estimated by the correlation processing section into a time domain, and a noise path removal section that removes a path having a value less than a predetermined noise threshold value as a noise path, and the average value of the noise that have been removed through the time window filter is used as noise level for use in determination of the noise threshold value.

8. A radio system using the channel estimation device according to claim 1.

9. An equalization device that converts a single carrier signal into a frequency domain signal and performs equalization processing through frequency domain signal processing, comprising:

a ZF calculation/clipping processing section that uses a signal obtained by converting a pilot code into a frequency domain to calculate a pilot reference signal according to a Zero Forcing (ZF) method and clips the gain of the calculated pilot reference signal to a predetermined value to generate a clipped pilot reference signal;

a correlation processing section that performs correlation between a pilot reception signal in the frequency domain and clipped pilot reference signal to estimate channel characteristics of the frequency domain;

a weight calculation section that calculates an equalization weight based on the channel characteristics of the frequency domain; and an equalization filter that performs equalization processing of a frequency domain reception signal using the equalization weight wherein the ZF calculation/clipping processing section generates a pilot reference X(m) of a sub-carrier m such that the following equations are satisfied:

$$X(m) = G(m)C(m)$$

$$G(m) = \begin{cases} \frac{1}{|C(m)|^2} & \frac{1}{|C(m)|^2} < G_{TH} \\ G_{TH} & \frac{1}{|C(m)|^2} \geq G_{TH} \end{cases}$$

where $m(1 \leq m \leq N_{FFT}$: $N_{FFT}$ is an integer equal to or more than 2 and power of 2) is a sub-carrier number, C(m) is a signal of the sub-carrier m, obtained by converting the pilot code into the frequency domain, G(m) is the gain of the clipped pilot reference signal, X(m) is the clipped reference pilot signal, and $G_{TH}$ is a predetermined value of the clipping.

10. The equalization device according to claim 9, wherein the ZF calculation/clipping processing section changes, in an adaptive manner, the predetermined value of the clipping in inversely proportional to a noise power value.

11. The equalization device according to claim 9, wherein the ZF calculation/clipping processing section previously calculates a plurality of pilot reference signal candidates clipped to different predetermined values and selects, from the plurality of pilot reference signal candidates, a pilot reference signal clipped to an optimum value based on a value inversely proportional to the noise power value.

12. The equalization device according to claim 9, further comprising, in the rear stage of the correlation processing section, a noise suppression section that suppresses noise of a channel estimation value estimated by the correlation processing section to improve the ratio of signal power to noise power (S/N).

13. The equalization device according to claim 12, wherein the noise suppression section includes one or both of: a time window filter that removes a part of the path other than a predetermined section as a noise path from the respective paths of the channel response obtained by converting the channel estimation value estimated by the correlation processing section into a time domain, and a noise path removal section that removes a path having a value less than a predetermined noise threshold value as a noise path, and the channel response from which the noise path has been removed is converted into the frequency domain so as to output a channel estimation value in which noise has been suppressed.

14. The equalization device according to claim 12, wherein the noise suppression section includes: a time window filter that removes a part of the path other than a predetermined section as a noise path from the respective paths of the channel response obtained by converting the channel estimation value estimated by the correlation processing section into a time domain, and a noise path removal section that removes a path having a value less than a predetermined noise threshold value as a noise path, and the average value of the noise that have been removed through the time window filter is used as noise level for use in determination of the noise threshold value.

15. The equalization device according to claim 9, wherein the weight calculation section calculates the equalization weight based on an MMSE (Minimum Mean Square Error) method or a ZF method.

16. A radio system using the equalization device according to claim 9.

17. A channel estimation method that converts a single carrier signal into a frequency domain signal and estimates channel characteristics through frequency domain signal processing, comprising:

performing a Zero Forcing (ZF) calculation/clipping processing that calculates a pilot reference signal according to a Zero Forcing (ZF) method by using a signal obtained by converting a pilot code into a frequency domain and that clips the gain of the calculated pilot reference signal to a predetermined value to generate a clipped pilot reference signal; and performing correlation between a pilot reception signal in the frequency domain and clipped pilot reference signal to estimate channel characteristics of the frequency domain
wherein
the ZF calculation/clipping processing section generates a pilot reference X(m) of a sub-carrier m such that the following equations are satisfied:

$$X(m) = G(m)C(m)$$

$$G(m) = \begin{cases} \dfrac{1}{|C(m)|^2} & \dfrac{1}{|C(m)|^2} < G_{TH} \\ G_{TH} & \dfrac{1}{|C(m)|^2} \geq G_{TH} \end{cases}$$

where m($1 \leq m \leq N_{FFT}$: $N_{FFT}$ is an integer equal to or more than 2 and power of 2) is a sub-carrier number, C(m) is a signal of the sub-carrier m, obtained by converting the pilot code into the frequency domain, G(m) is the gain of the clipped pilot reference signal, X(m) is the clipped reference pilot signal, and $G_{TH}$ is a predetermined value of the clipping.

18. An equalizing method that converts a single carrier signal into a frequency domain signal and performs equalization processing through frequency domain signal processing, comprising:

performing a Zero Forcing (ZF) calculation/clipping processing that calculates a pilot reference signal according to a Zero Forcing (ZF) method by using a signal obtained by converting a pilot code into a frequency domain and that clips the gain of the calculated pilot reference signal to a predetermined value to generate a clipped pilot reference signal;

performing correlation between a pilot reception signal in the frequency domain and clipped pilot reference signal to estimate channel characteristics of the frequency domain;

calculating an equalization weight based on the channel characteristics of the frequency domain; and performing equalization processing of a frequency domain reception signal using the equalization weight wherein the ZF calculation/clipping processing section generates a pilot reference X(m) of a sub-carrier m such that the following equations are satisfied:

$$X(m) = G(m)C(m)$$

$$G(m) = \begin{cases} \dfrac{1}{|C(m)|^2} & \dfrac{1}{|C(m)|^2} < G_{TH} \\ G_{TH} & \dfrac{1}{|C(m)|^2} \geq G_{TH} \end{cases}$$

where m($1 \leq m \leq N_{FFT}$: $N_{FFT}$ is an integer equal to or more than 2 and power of 2) is a sub-carrier number, C(m) is a signal of the sub-carrier m, obtained by converting the pilot code into the frequency domain, G(m) is the gain of the clipped pilot reference signal, X(m) is the clipped reference pilot signal, and $G_{TH}$ is a predetermined value of the clipping.

* * * * *